(12) United States Patent
Cunningham et al.

(10) Patent No.: US 7,877,288 B1
(45) Date of Patent: *Jan. 25, 2011

(54) MANUFACTURER'S OFFER REDEMPTION SYSTEM

(75) Inventors: William R. Cunningham, Anna, IL (US); Richard W. White, Milton, FL (US)

(73) Assignee: Cunningham Electronics Corporation, Anna, IL (US)

( * ) Notice: Subject to any disclaimer, the term of this patent is extended or adjusted under 35 U.S.C. 154(b) by 1437 days.

This patent is subject to a terminal disclaimer.

(21) Appl. No.: 10/838,896

(22) Filed: May 4, 2004

Related U.S. Application Data

(60) Provisional application No. 60/467,805, filed on May 5, 2003.

(51) Int. Cl.
*G06Q 30/00* (2006.01)
(52) U.S. Cl. .................................. 705/14.26
(58) Field of Classification Search ............. 705/14, 705/14.26
See application file for complete search history.

(56) References Cited

U.S. PATENT DOCUMENTS

| | | | |
|---|---|---|---|
| 4,949,256 A * | 8/1990 | Humble | 705/14 |
| 5,128,520 A * | 7/1992 | Rando et al. | 235/375 |
| 5,256,863 A * | 10/1993 | Ferguson et al. | 705/21 |
| 5,380,991 A * | 1/1995 | Valencia et al. | 235/383 |
| 5,428,684 A * | 6/1995 | Akiyama et al. | 705/66 |
| 6,041,309 A * | 3/2000 | Laor | 705/14 |
| 6,076,069 A * | 6/2000 | Laor | 705/14 |
| 6,321,208 B1 * | 11/2001 | Barnett et al. | 705/14 |
| 6,360,254 B1 * | 3/2002 | Linden et al. | 709/219 |
| 6,360,322 B1 * | 3/2002 | Grawrock | 713/176 |
| 6,385,591 B1 * | 5/2002 | Mankoff | 705/14 |
| 6,584,448 B1 * | 6/2003 | Laor | 705/14 |

(Continued)

FOREIGN PATENT DOCUMENTS

WO   WO 95/30199   * 11/1995

OTHER PUBLICATIONS

Bruce Schneier, Applied Cryptography, 2$^{nd}$ Edition, 1966, John Wiley and Sons Inc., pp. 29-42.*

*Primary Examiner*—John G Weiss
*Assistant Examiner*—Matthew L Hamilton
(74) *Attorney, Agent, or Firm*—Levenfeld Pearlstein, LLC (57) ABSTRACT

A manufacturer's offer ("coupon") redemption system used to validate and verify a manufacturer's offer and authenticate and substantiate an offer redemption transaction while minimizing fraud. The system is a closed system in a controlled environment. The system includes a central registry where manufacturers register their offers, a manufacturer's offer redemption terminal in communication with a retailer's point-of-sale ("POS") system, and a manufacturer's offer clearinghouse. The POS system communicates with the registry to maintain an updated database of valid offers. The POS system communicates with the manufacturer's offer redemption terminal to validate and verify offers presented for redemption. The manufacturer's offer redemption terminal includes a means to generate an encrypted identifier ("token") which is unique to each manufacturer's offer redemption transaction. The encrypted token is attached to the purchase event transaction log, and the purchase event transaction log (including the token) is transmitted to the manufacturer's offer clearinghouse. The clearinghouse independently recreates the token based on the offer redemption record and the purchase event transaction log and authenticates the transaction as having originated under the controlled conditions imposed by the system, which includes destruction of the redeemed offer.

30 Claims, 7 Drawing Sheets

U.S. PATENT DOCUMENTS

| | | | |
|---|---|---|---|
| 6,779,747 B2 * | 8/2004 | McLean et al. | 241/30 |
| 7,013,286 B1 * | 3/2006 | Aggarwal et al. | 705/14 |
| 7,016,860 B2 * | 3/2006 | Modani et al. | 705/14 |
| 7,055,031 B2 * | 5/2006 | Platt | 713/168 |
| 7,213,777 B2 * | 5/2007 | Podrovitz | 241/37.5 |
| 7,240,843 B2 * | 7/2007 | Paul et al. | 235/472.01 |
| 7,308,254 B1 * | 12/2007 | Rissanen | 455/414.1 |
| 2001/0014870 A1 * | 8/2001 | Saito et al. | 705/14 |
| 2002/0004783 A1 * | 1/2002 | Paltenghe et al. | 705/41 |
| 2002/0010627 A1 * | 1/2002 | Lerat | 705/14 |
| 2002/0042774 A1 * | 4/2002 | Ortiz et al. | 705/39 |
| 2002/0116271 A1 * | 8/2002 | Mankoff | 705/14 |
| 2002/0138348 A1 * | 9/2002 | Narayan et al. | 705/14 |
| 2002/0194069 A1 * | 12/2002 | Thakur et al. | 705/14 |
| 2002/0198777 A1 * | 12/2002 | Yuasa | 705/14 |
| 2003/0061170 A1 * | 3/2003 | Uzo | 705/64 |
| 2003/0064713 A1 * | 4/2003 | Deshpande | 455/414 |
| 2004/0054590 A1 * | 3/2004 | Redford et al. | 705/14 |
| 2004/0103023 A1 * | 5/2004 | Irwin et al. | 705/14 |
| 2004/0103312 A1 * | 5/2004 | Messerges et al. | 713/201 |
| 2004/0143500 A1 * | 7/2004 | Lopez et al. | 705/14 |
| 2004/0143501 A1 * | 7/2004 | Lopez et al. | 705/14 |
| 2004/0158492 A1 * | 8/2004 | Lopez et al. | 705/14 |
| 2005/0125287 A1 * | 6/2005 | Sureka et al. | 705/14 |
| 2005/0222910 A1 * | 10/2005 | Wills | 705/22 |
| 2006/0015404 A1 * | 1/2006 | Tran | 705/14 |

\* cited by examiner

MANUFACTURER'S OFFER REDEMPTION SYSTEM

CROSS-REFERENCE TO RELATED APPLICATIONS

This application claims the benefit of U.S. Provisional Application No. 60/467,805, filed May 5, 2003.

STATEMENT REGARDING FEDERALLY SPONSORED RESEARCH OR DEVELOPMENT

Not Applicable

REFERENCE TO A SEQUENCE LISTING, TABLE, OR COMPUTER PROGRAM LISTING

Not Applicable

BACKGROUND OF THE INVENTION (1) Field of the Invention

The present invention relates generally to manufacturer's offers (traditionally known as "coupons") and, more particularly, to a manufacturer's offer redemption system (the "system") used to validate and verify manufacturer's offers and authenticate manufacturer's offer redemption transactions.

(2) Description of the Prior Art

Manufacturer's offers (or "offers" or "coupons") have become a valuable marketing tool for manufacturers and retailers seeking to increase sales and collect consumer demographic information. Although manufacturer's offers were first introduced decades ago, the process for redeeming manufacturer's offers has remained relatively unchanged. The traditional manufacturer's offer redemption process typically involves consumer collection of published manufacturer's offers, often found in Sunday newspapers, direct mailings, and other publications. Manufacturer's offers are presented for redemption by the consumer to a retailer at the retailer's cash register when making a purchase. The manufacturer's offers generally are inspected by the retailer's cashier to confirm the expiration date. Sometimes, but not regularly, the cashier may choose to review the purchased products to determine whether or not the consumer actually purchased the products (in the correct sizes, quantities, and/or combinations) required by the manufacturer's offers. The cashier then manually enters the values of the manufacturer's offers in the cash register for subtraction from the total purchase price.

The manufacturer's offers collected by retailers then are manually sorted and returned to the manufacturers for reimbursement. Typically, this is done by a professional clearinghouse. Retailers bundle together redeemed manufacturer's offers and ship them to the clearinghouse. The clearinghouse then sorts the manufacturer's offers by manufacturer and retailer and forwards the manufacturer's offers to the correct manufacturer along with an invoice for payment. The manufacturer generally reviews the manufacturer's offers for evidence of fraud (for example, a large number of evenly cut offers) or other irregularities and then issues checks to the retailers, through the clearinghouse, based on the number of manufacturer's offers that the manufacturer deems valid. If some manufacturer's offers are deemed invalid, the retailers will not be paid for such offers. This is known as a "chargeback." Such chargebacks then typically are deducted from retailers' future payments to the manufacturer for products delivered to the retailers. This time-consuming process creates additional costs for manufacturers, retailers, and, ultimately and ironically, consumers.

Not only is the traditional prior art manufacturer's offer redemption process costly, it is replete with opportunities to defraud manufacturers on various levels. For example, with the advent of relatively inexpensive and high-quality personal computer equipment, manufacturer's offers may be forged. Additionally, consumers may submit expired manufacturer's offers or manufacturer's offers for products, sizes, quantities, and/or combinations that were not actually purchased. That is, traditional methods of manufacturer's offer redemption do not correlate a specific product sale to each specific redeemed manufacturer's offer at the time of redemption at the retailer. Moreover, it has recently been reported that fraudulent manufacturer's offer redemption schemes may have financed terrorist activities.

In response to the spread of fraudulent redemption of manufacturer's offers, the prior art has seen several systems developed to counter fraud. For example, universal product codes ("UPCs") and UCC/EAN-128 coupon extended codes have been added to many manufacturer's offers. Manufacturer's offers encoded with UPCs and UCC/EAN-128 coupon extended codes can be scanned by both traditional and customized point-of-sale ("POS") barcode readers. The UPC and UCC/EAN-128 coupon extended code data may include the manufacturer's offer expiration date, offer value, the required size and quantity, and the like. It is expected that within the next several years, UPC and UCC/EAN-128 coupon extended codes maybe supplanted by reduced space symbology ("RSS") barcodes which allow even more data to be stored in the same amount of space.

In some prior art retailer POS systems, the values of the manufacturer's offers are automatically deducted from the total purchase price using a scanning device to scan barcoded manufacturer's offers. Other prior art systems provide that as a manufacturer's offer is scanned, it may be checked against a database file to ensure that it is a valid offer. Some prior art systems even go so far as to compare the manufacturer's offer barcode data to the transaction log of purchased products to confirm that the required product actually was purchased in the correct size and quantity and, if so, destroy or otherwise invalidate the manufacturer's offer. However, unless such a process is completed in a closed, controlled environment, with the ability to independently audit the manufacturer's offer redemption transaction, the possibility of fraud still exists.

Therefore, what is needed to eliminate fraud is a closed system—a controlled manufacturer's offer redemption environment in which manufacturer's offers may be verified, validated, and destroyed to prevent re-use, and the offer redemption transaction authenticated to confirm that the offer in fact was redeemed under the controlled conditions imposed by the system.

BRIEF SUMMARY OF THE INVENTION

The present invention is a closed system that eliminates fraud in the manufacturer's offer redemption process. The system utilizes a manufacturer's offer redemption terminal consisting of a housing containing a barcode scanner for reading the data on bar-coded manufacturer's offers, a shredder to render the manufacturer's offers invalid for subsequent use, and a means to generate an encrypted identifier, or "token," which is unique to each manufacturer's offer redemption transaction. The encrypted token is attached to the POS purchase event transaction log ("TLOG"), and is used to verify that the transaction originated under the controlled conditions imposed by the system.

The manufacturer's offer redemption terminal is connected to the retailer's POS system and, upon activation, receives the purchase event transaction log identifier and current date from the cash register. The purchase event transaction log identifier, along with the barcoded manufacturer's offer data, the current date, and other information form the basis of the encrypted token. When the transaction is later submitted for reimbursement and/or audited, a token is independently generated from the purchase event transaction log to compare to the token generated during the transaction. Since the token generated during the transaction could only have originated under the controlled conditions imposed by the operation of the manufacturer's offer redemption terminal, which includes destruction of the redeemed offer, the authenticity of the transaction therefore is verified if the tokens match.

The manufacturer's offer redemption terminal is operated by inserting the manufacturer's offer into a slot with the offer barcode oriented for the scanner to read the barcode. The scanner senses the presence of the offer, reads the barcode, and communicates the barcode data to the cash register for verification and validation using a database registry of known valid manufacturer's offers. If valid, the cash register activates the manufacturer's offer redemption terminal's shredder which pulls the manufacturer's offer through the shredder and destroys it. Upon sensing that the offer has been shredded, the manufacturer's offer redemption terminal generates the token and communicates it to the cash register where the transaction is then posted and the token is attached to the coupon redemption record in the purchase event transaction log.

The system further includes a central registry where manufacturer's offers are registered. The manufacturer's offer registry provides the source for manufacturer's offer data against which each manufacturer's offer is verified and validated. The manufacturer's offer registry is downloaded to the retailer's POS systems and updated on a regular, scheduled basis. The data is stored in the retailer's POS system in the form of a database, where the manufacturer's offers can be matched to the database records to insure that altered or unapproved manufacturer's offers are not redeemed.

The system also includes a clearinghouse to facilitate settlement of accounts between manufacturers and retailers. The clearinghouse also serves to verify that manufacturer's offer transactions submitted for payment are valid. Purchase events containing offer redemption transactions with tokens are screened for authenticity by recreating a token based on the purchase event information; if the recreated token matches the token that was attached to the manufacturer's offer transaction, then the transaction is deemed authentic. The clearinghouse further authenticates the transaction by revalidating and reverifying the manufacturer's offer using the data from the manufacturer's offer registry and the purchase event transaction log.

It is a therefore a principal object of the present invention to provide a manufacturer's offer redemption system that eliminates fraud.

Another object of the invention is to provide a manufacturer's offer redemption system that reduces costs to manufactures, retailers, and consumers.

A further object of the present invention is to provide a manufacturer's offer redemption system that verifies the validity of a manufacturer's offer before redeeming it.

Yet another object of the present invention is to provide a manufacturer's offer redemption system that generates an encrypted token to verify and authenticate a manufacturer's offer redemption transaction.

It is another object of the present invention to provide a manufacturer's offer redemption system that is interoperable with a retailer's point of sale system.

Another object of the present invention is to provide a manufacturer's offer redemption system that includes a terminal with a means to prevent re-use of a manufacturer's offer once it has been validated and redeemed.

A further object of the present invention is to provide a manufacturer's offer redemption system that is a closed system.

An additional object of the present invention is to provide a manufacturer's offer redemption system that manages the redemption of manufacturer's offers under controlled conditions.

It is another object of the present invention to provide a manufacturer's offer redemption system that maintains a central registry of valid manufacturer's offers.

Yet another object of the present invention is to provide a manufacturer's offer redemption system that is to provide a manufacturer's offer clearinghouse for authenticating manufacturer's offer redemption transactions prior to payment for the transactions from the manufacturer to the retailer.

An important object of the present invention is the creation and retention of a complete audit trail of all redeemed manufacturer's offers cleared by the invention which is preserved at the clearinghouse for a specific period of time for review.

Other and more specific objects will in part be obvious and will in part appear hereinafter.

DETAILED DESCRIPTION OF THE PREFERRED EMBODIMENT

It will be appreciated that certain elements of the figures are abbreviations or references for elements of the present invention otherwise referenced herein. For example, reference's to "CEC" and "CEC's" indicate "Cunningham Electronic Corporation" owner by assignment of the instant application but can refer to any operator of the manufacturer's offer redemption system of the present invention. Manufacturer's offer redemption terminal 7 is also identified as "New CT" (CT being an abbreviation for "coupon terminal"). Additionally, point of sale terminals (or "POS terminals") are sometimes abbreviated as "POST" such as in FIG. 1's reference to "Store POST Controller." Additionally, it will be appreciated by those skilled in the art that a "transaction log," as used herein, means a record of items purchased during a purchase transaction.

The preferred embodiment of the manufacturer's offer redemption system of the present invention is shown in FIGS. 1 through 7 and further described herein. The system consists of three primary components in the preferred embodiment: the manufacturer's offer registry 1, the manufacturer's offer redemption terminal 2, and the manufacturer's offer clearinghouse 3. In the preferred embodiment, the manufacturer's offer registry 1 and the manufacturer's offer clearinghouse 3 both are stored within a single central data center 4, comprising at least one suitable computer and/or server as well known in the prior art. It will be appreciated, however, that the manufacturer's offer registry 1 and the manufacturer's offer clearinghouse 3 could be separately stored on suitable computers and/or servers without affecting the operability of the system and without departing from the spirit of the present invention.

Figure 1:
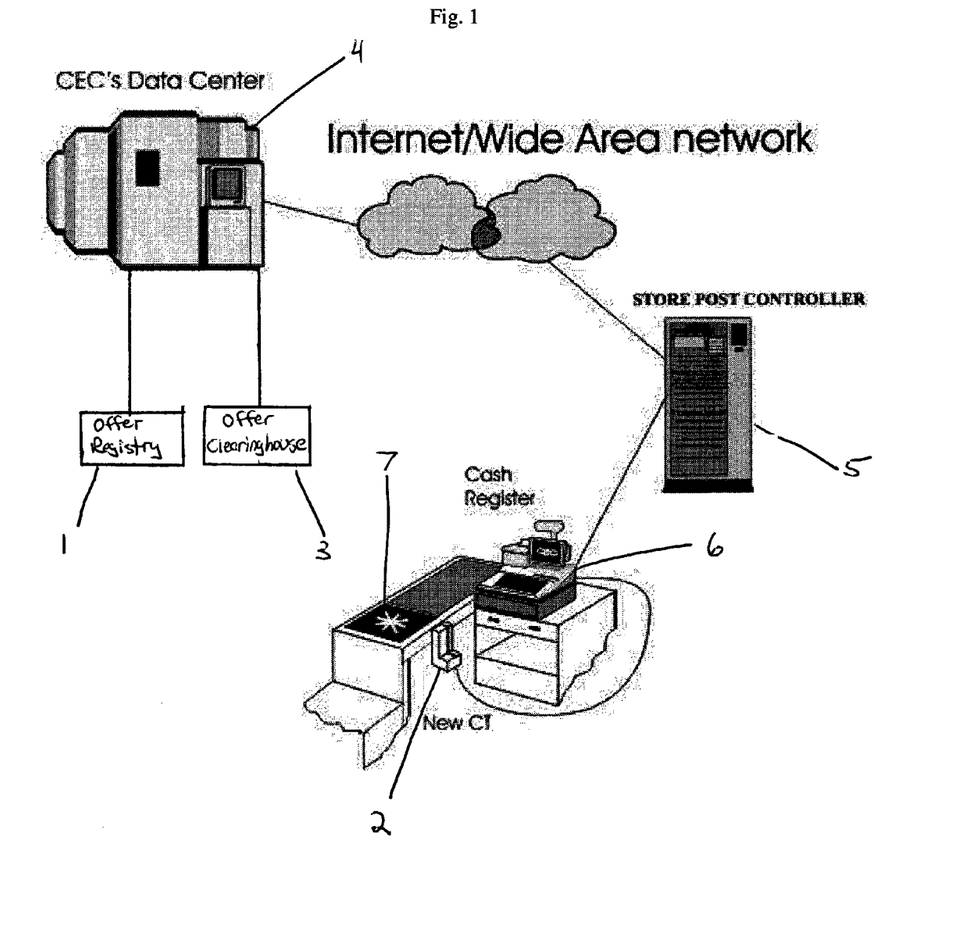
FIG. 1 is diagram showing relation of the major elements of the manufacturer's offer redemption system in the preferred embodiment of the present invention.

FIG. 1 shows the general operational relationship between the major components of the system in the preferred embodiment. The manufacturer's offer registry 1, as further discussed below, is an electronic database of manufacturer's offers. It is stored on any suitable software-programmable computer and/or server known in the art. In the preferred embodiment, the manufacturer's offer registry 1, is stored in the data center 4. In turn, the data center 4 is capable of communicating with a retailer's POS system controller 5, typically located at the retailer's physical store location. In the preferred embodiment, such communications occur over a worldwide computer network, such as the Internet; however, such communications may occur using prior art dial-up or other networking methods. Additionally, in the preferred embodiment, communications between the POS system controller 5 and the data center 4 are encrypted or otherwise securely transmitted to protect the integrity and confidentiality of the data.

As further shown in FIG. 1, the POS system controller 5 also is a software-programmable computer and/or server known in the art and is capable of communicating with at least one, and in most cases a plurality, of POS terminals (such as cash registers). Communications between the POS system controller 5 and the POS terminal(s) 6 is accomplished through traditional prior art data communications means, such as an in-store POS network. Using traditional prior art communications means, a manufacturer's offer redemption terminal 2 is connected to each POS terminal 6. Lastly, as well known in the prior art, a product scanning device 7 also interfaces with each POS terminal 6.

The operation of a traditional POS system is well known in the prior art. A product to be purchased is scanned by scanning device 7 to identify and decode the unique product-identifying barcode data typically printed on the exterior of the product's packaging. Scanning device 7 then cooperates with POS terminal 6 and POS system controller 5 to identify the product being purchased, print a customer receipt, and create a purchase event transaction log ("TLOG"). The present invention builds on this well-known and well-tested POS system model to add manufacturer's offer validation, verification, and redemption as discussed in detail below.

Manufacturer's Offer Registry

Figure 2:
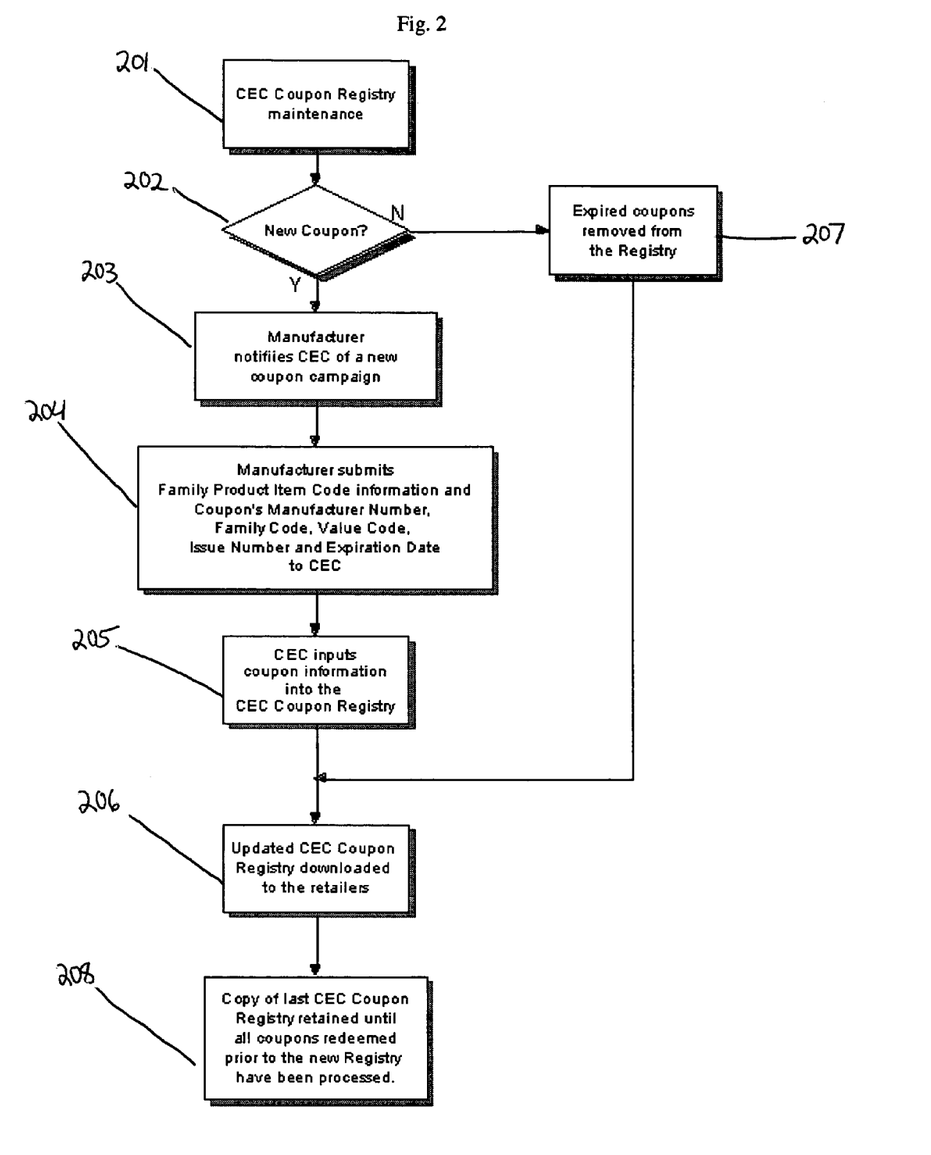
FIG. 2 is a flowchart showing the operation of the manufacturer's offer registry in the preferred embodiment of the present invention.

As discussed above, the manufacturer's offer registry 1 (or, "registry") is an electronic database of all valid participating manufacturer's offers that may be validated using the manufacturer's offer redemption system of the present invention. FIG. 2 is a flowchart showing operation of the registry. The registry preferably is maintained at a central location, such as the data center, and is updated on a regular, consistent basis to ensure that the manufacturer's offer data within it is accurate and up-to-date. A copy of the entire registry initially is transmitted to a retailer upon the retailer's participation in the system. The copy of the registry is stored on the retailer's POS system controller. Thereafter, updates to the registry are disseminated to the retailer on a regular basis, such as nightly, weekly, or as otherwise needed.

To minimize the amount of data traffic, and the time for registry update data transmissions, registry data updates are transmitted in an ADD/DELETE format, meaning that the entire registry need not be downloaded each time an update is required (however, a full copy of the registry can be downloaded if needed, such as for disaster recovery or other purposes). To further minimize the amount of data traffic, data is expressed in a number series range format, rather than as a discrete series of numbers.

As shown in FIG. 2, maintenance 201 of the registry involves the addition of new manufacturer's offers and the removal of expired manufacturer's offers. To add 202 a new manufacturer's offer, the manufacturer first notifies 203 the registry manager of the existence of a new manufacturer's offer. Notification can be by any appropriate means, including by electronic mail, by fax, or by phone (although written notification is preferred in the preferred embodiment). The manufacturer then assembles all pertinent information regarding the new manufacturer's offer and transmits it to the registry manager 204. In the preferred embodiment, this information includes the following data:

the manufacturer's product family item codes affected by the offer;

the manufacturer's Uniform Code Council (UCC)-assigned ID number that is printed on the offer;

the manufacturer's product family code that is printed on the offer;

the offer's UCC-assigned value code that is printed on the offer;

the manufacturer's assigned offer issue number that is printed on the offer;

the manufacturer's designated drop date for the offer;

the manufacturer's designated expiration date for the offer that is printed on the offer; and, a physical copy or lithographic proof copy of the offer.

The registry manager verifies the manufacturer's information against a physical offer supplied by the manufacturer for accuracy 205. If the data matches, the offer data is added to the registry. In the preferred embodiment, the registry data is downloaded to the retailer via the Internet or a direct dial-up connection to the registry host computer using traditional prior art data communication means 206. However, any comparable data communications means may be used. The offer drop date and expiration date control when that offer's record is added to, and removed from, the registry; thus, an offer is removed from the registry following the offer expiration date 207. Finally, copies of prior registries are maintained until all of the offers redeemed under such registries are processed 208.

Manufacturer's Offer Validation Process

Figure 3:
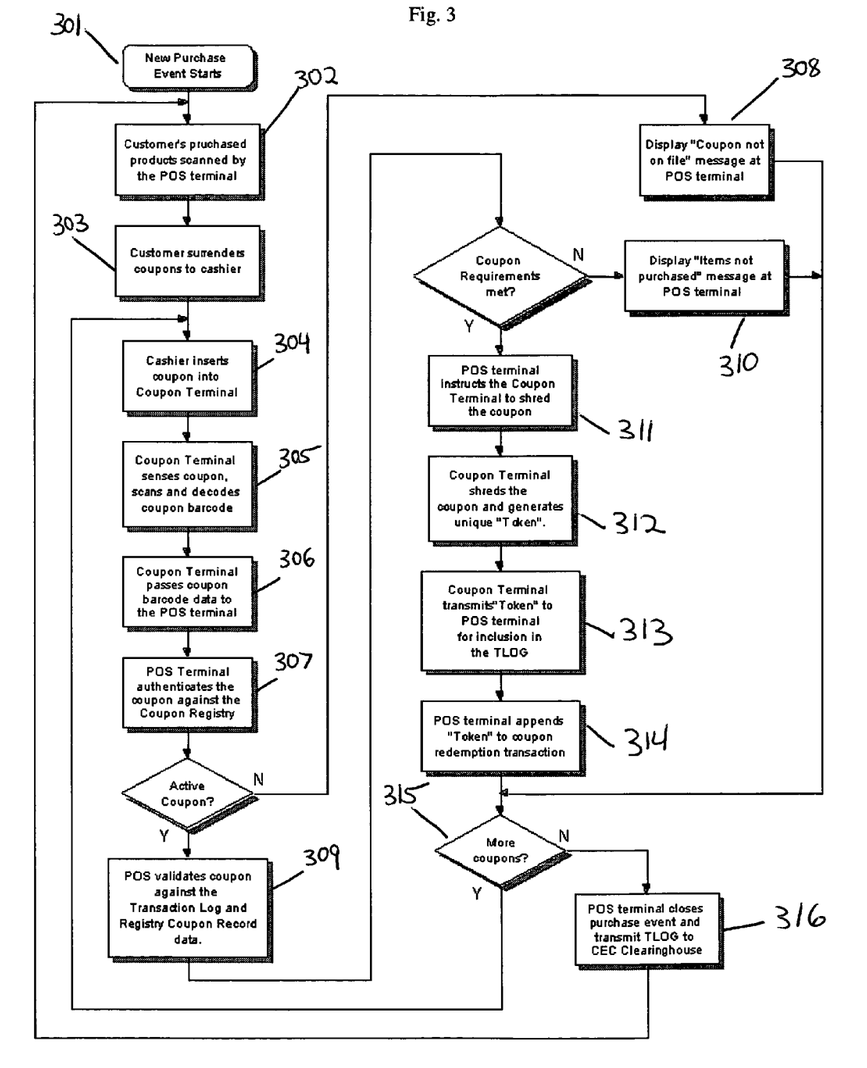
FIG. 3 is a flowchart showing the operation of the manufacturer's offer validation process in the preferred embodiment of the present invention.

As shown in FIG. 3, the manufacturer's offer validation process begins when the retailer's POS terminal (cash register) initiates a new purchase event record and transmits that record number and current date to the manufacturer's offer redemption terminal 301. Next, all of the customer's purchases are scanned by the POS terminal 302 and the customer surrenders their manufacturer's offers to the cashier for redemption 303. The cashier then inserts each manufacturer's offer individually into the reader slot in the manufacturer's offer redemption terminal 304.

Once the offer has been inserted into the slot, the manufacturer's offer redemption terminal senses its presence, and reads and decodes the barcode printed on the offer 305. If the manufacturer's offer redemption terminal can decode the barcode, the decoded data is sent to the POS terminal 306. If the offer is unreadable, an error message is sent to the POS terminal.

When the POS terminal receives the manufacturer's offer's decoded barcode information, it first attempts to validate the offer by looking in its copy of the registry (stored on the POS system controller) for a matching record 307. Offers that do not have a matching record in the registry are rejected 308. Offers that pass the validation test are passed onto the verification process. During the verification process, the POS purchase event transaction log ("TLOG") is scanned to verify that the offer's redemption requirements have been satisfied (such as the correct product family item, size, quantity, combination, etc.) 309. If all of the offer's requirements have not been met, an error message is displayed on the POS terminal's display and the offer is returned to the customer 310.

If all of the offer's requirements have been met, the POS terminal sends a command to the manufacturer's offer redemption terminal instructing the manufacturer's offer redemption terminal to turn on its shredder so that the offer can be destroyed 311. After the offer destruction is complete, the manufacturer's offer redemption terminal calculates a unique "token" based on the offer redemption transaction 312. The token is a number that is calculated based on a mathematical algorithm, which can be based on any number of variables from the offer redemption transaction. The token can be based on any desired mathematical algorithm without affecting the operation of the system, but the algorithm should be kept confidential to maintain the integrity of the system. In the preferred embodiment of the present invention, the token is based on a proprietary mathematical algorithm that uses the following numeric variables:

the manufacturer's number (encoded in the offer's UPC barcode);

the manufacturer's offer family code (encoded in the offer's UPC barcode);

the manufacturer's offer value code (encoded in the offer's UPC barcode);

the manufacturer's offer issue number (encoded in the offer's UPC barcode);

the retailer number;

the division number;

the store number;

the current date; and, the transaction number from the POS terminal.

The token then is transmitted to the POS terminal 313 where it is appended to the offer's redemption entry in the TLOG 314.

When all offers have been processed in the manner previously described 315, the POS terminal cashes out the purchase event and transmits the TLOG, through the POS system controller, to the manufacturer's offer clearinghouse for further processing 316.

Manufacturer's Offer Redemption Terminal

Figure 4:
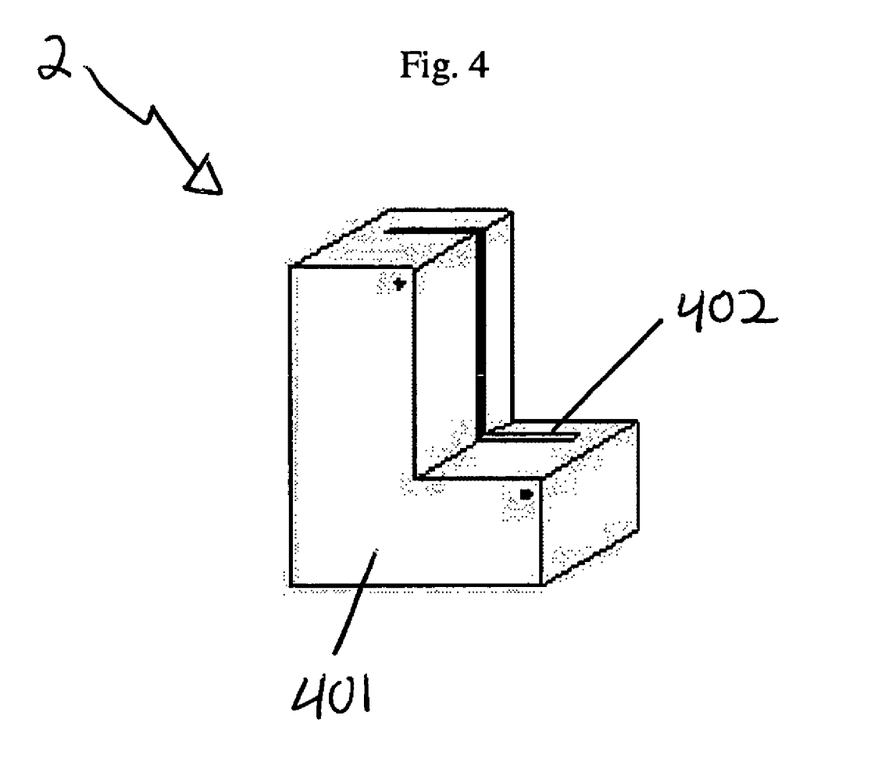
FIG. 4 is perspective view of the manufacturer's offer redemption terminal in the preferred embodiment of the present invention.
Figure 5:
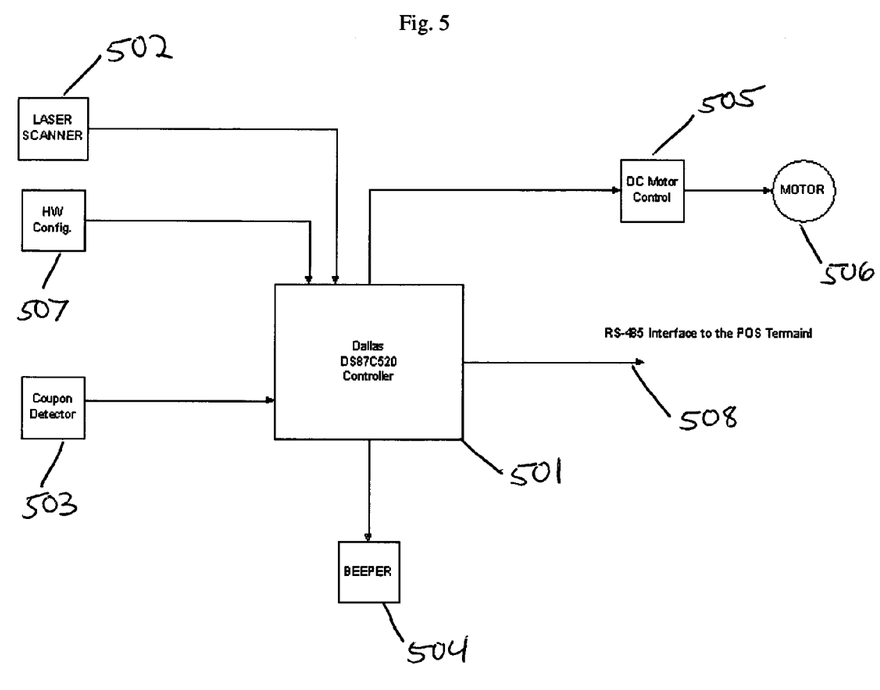
FIG. 5 is a block diagram of the manufacturer's offer redemption terminal in the preferred embodiment of the present invention.

The manufacturer's offer redemption terminal 2 is a type of document shredder with the internal capability to read and decode barcoded information. Although the device is specifically designed to process redemption offers in the retail environment, the general construction of such devices is well known in the prior art. The exterior of the manufacturer's offer redemption terminal in the preferred embodiment of the present invention is shown in FIG. 4, and generally comprises and exterior housing 401 and slot 402 for receiving offers. FIG. 5 shows the configuration of the manufacturer's offer redemption terminal's internal components, namely: a microcontroller 501, a laser scanner 502, an offer detector 503, a beeper, 504 a DC motor control 505, a DC motor connected to a shredding device 506, hardware configuration data storage means 507, and an RS-485 interface 508 to the retailer's POS terminal.

Figure 6:
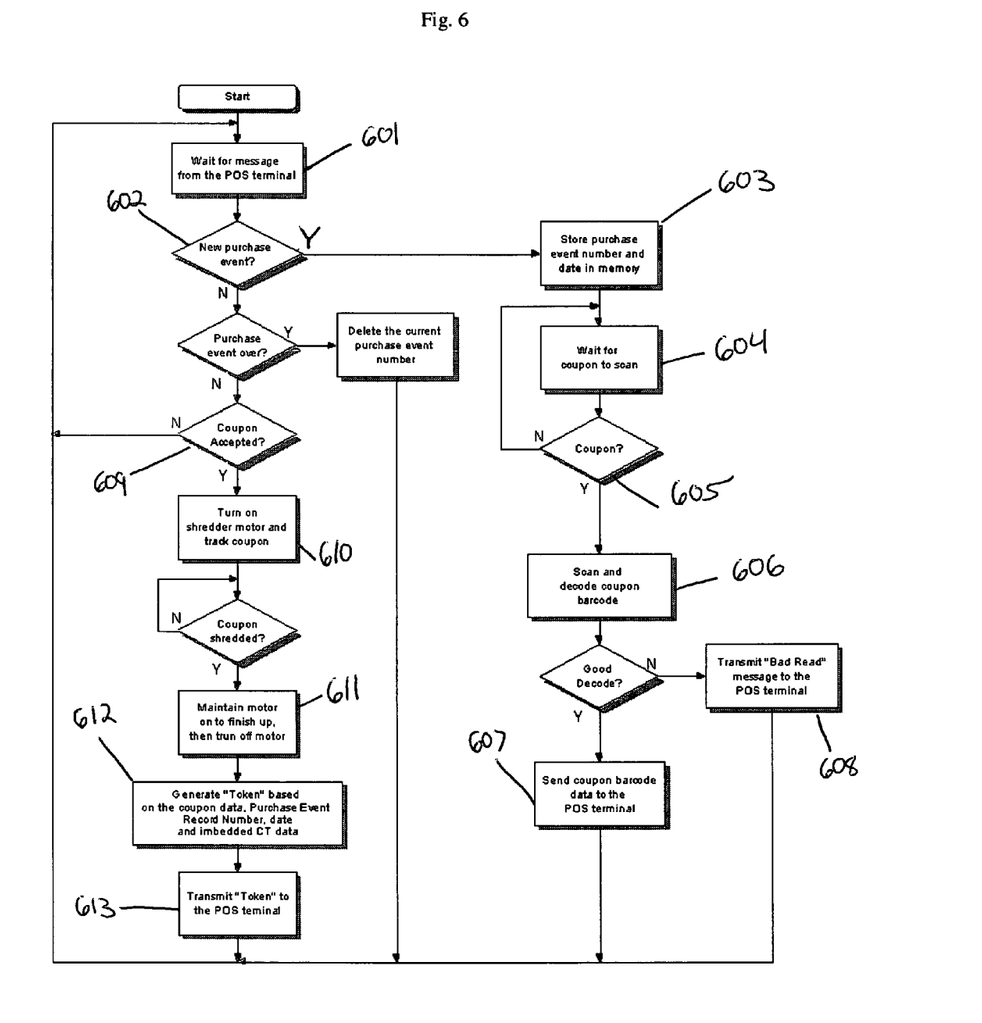
FIG. 6 is a flowchart showing the operation of the manufacturer's offer redemption terminal in the preferred embodiment of the present invention.

In operation, as shown in FIG. 6, the manufacturer's offer redemption terminal remains passive 601 until it receives a new purchase event communication from the retailer's POS terminal 602. The new purchase event message causes the manufacturer's offer redemption terminal to store the purchase event number and date in its memory 603 and forces the manufacturer's offer redemption terminal to begin looking for a manufacturer's offer to be inserted into its reader slot 604. When an offer is detected 605, the manufacturer's offer redemption terminal activates its barcode scanner and attempts to locate a barcode on the offer 606. In the preferred embodiment, the offer's barcode must have both a UPC offer code and UCC/EAN-128 coupon extended offer code portion to be valid (further barcode symbology may require other code portions). The barcode is read and decoded using standard, prior art reading and decoding technology. A properly decoded offer barcode is forwarded to the POS terminal for validation and verification 607, as described above. An offer that cannot be read is reported to the POS terminal as a unreadable 608. The cashier then can either try to reinsert the offer into the terminal, or return it to the customer.

If an offer has been properly validated and verified by the POS terminal 609, the POS terminal sends a shred message to the manufacturer's offer redemption terminal 610. When a shred message is received from the POS terminal, the manufacturer's offer redemption terminal activates its internal shredder and destroys the offer, rendering it invalid for subsequent use. To ensure that the offer has been destroyed, the offer's barcode is continually read and its progress tracked as it moves toward and through the shredder 610. This tracking process precludes a cashier from inserting a blank document into the paper path after an offer has been read and then extracting the offer when the shredding process begins. Once the offer has passed the sensors, the shredder motor remains active for a short period to ensure that the entire document has been destroyed 611. In another embodiment of the present invention, the offer's destruction may be confirmed by monitoring the shredder motor current. The shredder motor current increases as the shredder motor operates to destroy the offer and decreases once the offer has passed through the shredder. Undoubtedly, other offer destruction sensing means likely exist in the prior art and any such means to confirm the destruction of an offer may be utilized within the system of the present invention without departing from the scope of this disclosure.

Once the offer has been destroyed, the manufacturer's offer redemption terminal generates the token, as previously described, to uniquely identify the manufacturer's offer redemption transaction 612. The token is transmitted to the POS terminal which appends it to the manufacturer's offer redemption entry in the purchase event's TLOG 613. When the POS terminal closes the purchase event, a message is sent to the manufacturer's offer redemption terminal to indicate the end of that session. The terminal then returns to its idle state until the next purchase event. The TLOG, along with all appended tokens, is stored in the POS system controller for transmission to the manufacturer's offer clearinghouse.

Manufacturer's Offer Clearinghouse

The manufacturer's offer clearinghouse ("clearinghouse") is a computer software program that performs the final validation and verification of all offers redeemed through the manufacturer's offer redemption system of the present invention, generates all invoicing to the participating manufacturers, and transfers the offer redemption amounts and handling fees to the participating retailers.

Figure 7:
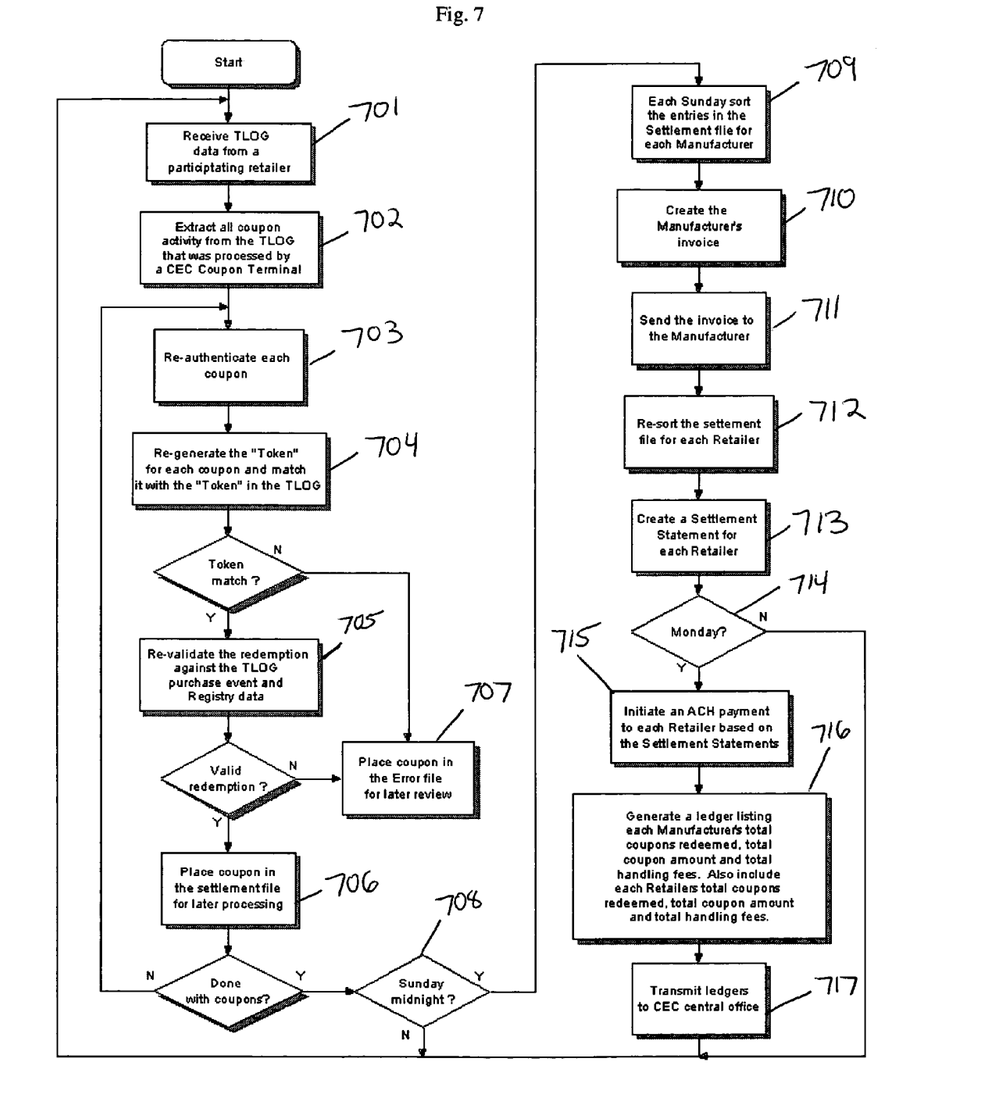
FIG. 7 is a flowchart showing the operation of the manufacturer's offer clearinghouse in the preferred embodiment of the present invention.

As shown in FIG. 7, the clearinghouse receives the purchase event transaction logs ("TLOGs") from cashed out purchase events as communicated from the POS system controller 5 at participating retailers 701. The clearinghouse first filters the TLOGs for all manufacturer's offer redemption activity that includes an appended token 702, an indication that such offers are registered as part of the manufacturer's offer redemption system of the present invention. Each of the redeemed offers then is authenticated 703 by regenerating the token using the same data and algorithm that the manufacturer's offer redemption terminal used to create the initial token 704. If the two tokens match, then the authentication is considered complete. Next the offer is reverified and revalidated against the purchased items in the TLOG and offer requirements listed in the offer's registry record 705. Once this test has been successfully completed, the offer is placed into an electronic settlement file 706. Offers in the settlement file then await further processing as described below.

If the initial token and the regenerated token do not match, or if the offer fails reverification and/or revalidation, the offer is placed in an electronic error file for later manual review 707. Offers in the "error" file are manually processed to verify the legitimacy of their redemption and are not reimbursed until their status has been cleared.

The settlement file is sorted regularly, every Sunday at midnight 708 in the preferred embodiment. The first sort of the settlement file sorts redeemed offers by manufacturer 709. Once the offers are sorted, the clearinghouse creates 710 and sends 711 invoices to all participating manufacturers for which offers have been redeemed. The invoices list the quantity and dollar amount of each offer redeemed over the past week (in the preferred embodiment) and their associated handling fees. Invoices to the manufacturers may be sent by email (in the preferred embodiment), facsimile, and/or postal mail. In the preferred embodiment, manufacturer's payment of invoices is due by the Friday following the invoice date.

The settlement file then is re-sorted by retailer 712 and settlement statements for each participating retailer are prepared 713. The settlement statements list the quantity, dollar amount, and the retailer's handling fees associated with those offers redeemed at each of the retailer's stores. In the preferred embodiment, this statement is electronically transmitted to the retailer, but may also be sent by facsimile and/or postal mail.

In the preferred embodiment, on the Monday following the Friday due date for payments from the manufacturers 714, the clearinghouse initiates automated clearinghouse (ACH) payments to the retailers' bank accounts for the amounts reflected on the settlement statements for the previous week's offer redemption activity 715. The clearinghouse then generates a ledger for internal recordkeeping purposes 716. The ledger lists each participating manufacturer, their total offers redeemed, the total offer dollar amount, and the total handling fees associated with those offer. There are also line items for each participating retailer. These entries include the total offers redeemed at each of the retailer's stores, the total offer dollar amount, and the total dollar amount of their handling fees. For secure storage, in the preferred embodiment the ledger is transmitted to a storage facility 717.

It will be appreciated that the timing for the above mentioned manufacturer's invoices, manufacturers' payment on such invoices, retailer's settlement statements, retailer's ACH payments, and ledger generation may vary from those identified in the preferred embodiment without departing from the scope and spirit of this invention. For example, manufacturer's invoices may be settled nightly instead of weekly and payments from manufacturers made the following day, with payments to retailers following a day after such manufacturer's payments.

The embodiments of the present invention described above are to be regarded in all respects as merely illustrative and not restrictive. Accordingly, the present invention may be embodied in other specific forms without deviating from the spirit thereof.

We claim:

1. A manufacturer's offer redemption system for authenticating a manufacturer's offer redemption transaction, the system comprising:
   a manufacturer's offer registry comprising an electronic database of manufacturer's offers capable of being redeemed, each offer having at least one redemption requirement;
   a point of sale system, the point of sale system having at least one store portal and configured to generate a transaction log during a product purchase transaction;
   a manufacturer's offer redemption terminal; and
   a manufacturer's offer clearinghouse;
   wherein said manufacturer's offer redemption terminal generates an initial token after validation, verification and destruction of a manufacturer's offer, the initial token based upon data generated by the point of sale system during the product purchase transaction and configured to permit authentication of the manufacturer's offer redemption transaction; and
   wherein said manufacturer's offer clearinghouse creates a regenerated token based upon the data generated by the point of sale system during the product purchase transaction and compares said regenerated token with said initial token to authenticate the manufacturer's offer redemption transaction.

2. The manufacturer's offer redemption system of claim 1 further comprising a central data center said manufacturer's offer registry and said manufacturer's offer clearinghouse stored in said central data center.

3. The manufacturer's offer redemption system of claim 1 wherein said electronic database of manufacturer's offers comprises at least one database record containing identifying information regarding at least one manufacturer's offer.

4. The manufacturer's offer redemption system of claim 3 wherein said at least one database record containing identifying information regarding at least one manufacturer's offer further comprises:
   an offer product family item code;
   an offer product ID number;
   an offer product family code;
   an offer product value code;
   an offer issue number;
   an offer start date; and
   an offer expiration date.

5. The manufacturer's offer redemption system of claim 1 wherein said point of sale system comprises at least one point of sale system controller and at least one point of sale terminal in communication with said point of sale system controller.

6. The manufacturer's offer redemption system of claim 5 wherein said point of sale system controller is configured_to maintain a copy of said manufacturer's offer registry.

7. The manufacturer's offer redemption system of claim 6 wherein said point of sale system controller is further configured to update said copy of said manufacturer's offer registry.

8. The manufacturer's offer redemption system of claim 5 wherein said at least one point of sale terminal is configured to communicate with said manufacturer's offer redemption terminal.

9. The manufacturer's offer redemption system of claim 1 wherein said manufacturer's offer redemption terminal comprises:
   a microcontroller;
   a laser scanner;
   an offer detector;
   a beeper;
   a direct current motor control;
   a direct current motor connected to a shredding device; and
   an interface to said at least one point of sale terminal,
      wherein said manufacturer's offer redemption terminal is configured to store data comprising a hardware configuration.

10. The manufacturer's offer redemption system of claim 5 wherein said manufacturer's offer redemption terminal is configured to read and decode barcode data on said manufacturer's offer.

11. The manufacturer's offer redemption system of claim 10 wherein said manufacturer's offer redemption terminal is further configured to communicate said barcode data to said at least one point of sale terminal.

12. The manufacturer's offer redemption system of claim 11 wherein said manufacturer's offer redemption terminal is further configured to permanently destroy said manufacturer's offer.

13. The manufacturer's offer redemption system of claim 12 wherein said manufacturer's offer redemption terminal comprises a shredder to permanently destroy said manufacturer's offer.

14. The manufacturer's offer redemption system of claim 12 wherein said manufacturer's offer redemption terminal generates said initial token only after said manufacturer's offer is permanently destroyed.

15. The manufacturer's offer redemption system of claim 11 wherein said at least one point of sale terminal is further configured to verify and validate said manufacturer's offer.

16. The manufacturer's offer redemption system of claim 15 wherein said at least one point of sale terminal is further configured to compare said manufacturer's offer to said registry and to the transaction log.

17. The manufacturer's offer redemption system of claim 1 wherein said initial token and said regenerated token are generated using a mathematical algorithm based on the data collected during the product purchase transaction.

18. The manufacturer's offer redemption system of claim 17 wherein said mathematical algorithm based on the data collected during the product purchase transaction comprises a plurality of variables.

19. The manufacturer's offer redemption system of claim 18 wherein said plurality of variables comprises;
   a manufacturer's number;
   a manufacturer's offer family code;
   a manufacturer's offer value code;
   a manufacturer's offer issue number;
   a retailer number;
   a division number;
   a store number;
   a current date; and,
   a transaction number.

20. The manufacturer's offer redemption system of claim 1 wherein said manufacturer's offer clearinghouse is configured to communicate with said point of sale system.

21. The manufacturer's offer redemption system of claim 20 wherein said manufacturer's offer clearinghouse is further configured to communicate with said manufacturer's offer registry.

22. The manufacturer's offer redemption system of claim 21 wherein said manufacturer's offer clearinghouse is further configured to verify and validate said manufacturer's offer.

23. The manufacturer's offer redemption system of claim 22 wherein said manufacturer's offer clearinghouse is further configured to compare said manufacturer's offer to said offer registry and to the transaction log.

24. The manufacturer's offer redemption system of claim 23 wherein said manufacturer's offer clearinghouse is further configured to segregate manufacturer's offers which cannot be authenticated, verified, or validated.

25. The manufacturer's offer redemption system of claim 1 wherein said manufacturer's offer clearinghouse is configured to create a manufacturer's invoice.

26. The manufacturer's offer redemption system of claim 1 wherein said manufacturer's offer clearinghouse is configured to create a retailer's statement.

27. The manufacturer's offer redemption system of claim 1 wherein said manufacturer's offer clearinghouse is configured to automate payment from a manufacturer to a retailer for said manufacturer's offer redemption transaction.

28. The manufacturer's offer redemption system of claim 25, 26 or 27 wherein said manufacturer's offer clearinghouse is further configured to generate a ledger.

29. A method for verifying, validating, and authenticating a manufacturers offer redemption transaction comprising the steps of:
   registering at least one manufacturers offer in a manufacturers offer registry, said manufacturers offer registry comprising an electronic database of manufacturers offers capable of being redeemed;
   allowing at least one point of sale system to access said manufacturers offer registry, the at least one point of sale system having at least one store portal and configured to generate a transaction log during a product purchase transaction;
   validating a presented manufacturers offer by comparing said presented manufacturers offer to said manufacturers offer registry;
   verifying said presented manufacturers offer by comparing said presented manufacturers offer to the transaction log generated by the at least one point of sale system;
   permanently destroying said presented manufacturers offer after said presented manufacturers offer is validated and verified using a manufacturers offer redemption terminal configured to permanently destroy said presented manufacturers offer so that said presented manufacturers offer cannot be reused;
   generating an initial token after said presented manufacturers offer is permanently destroyed, said initial token generated by the manufacturers offer redemption terminal, the initial token based upon data collected during the product purchase transaction and configured to permit authentication of the manufacturers offer redemption transaction;

creating a regenerated token, said regenerated token created by a manufacturers offer clearinghouse and based upon the data collected during the product purchase transaction; and the manufacturers offer clearinghouse authenticating said manufacturers offer redemption transaction by comparing said initial token and said regenerated token.

30. The method according to claim 29 further comprising the steps of:

generating a manufacturer's invoice;

generating a retailer's statement; and automating payment from a manufacturer to a retailer for said manufacturer's offer redemption transaction.

* * * * *